United States Patent
Wu

(10) Patent No.: US 11,154,158 B2
(45) Date of Patent: Oct. 26, 2021

(54) DRIP COFFEE BAG HOLDER

(71) Applicant: Pro-Iroda Industries, Inc., Taichung (TW)

(72) Inventor: Wei Cheng Wu, Taichung (TW)

(73) Assignee: Pro-Iroda Industries, Inc., Taichung (TW)

( * ) Notice: Subject to any disclaimer, the term of this patent is extended or adjusted under 35 U.S.C. 154(b) by 399 days.

(21) Appl. No.: 16/212,853

(22) Filed: Dec. 7, 2018

(65) Prior Publication Data

US 2019/0313837 A1    Oct. 17, 2019

(30) Foreign Application Priority Data

Apr. 17, 2018   (TW) ................................. 107113071

(51) Int. Cl.
*A47J 31/06* (2006.01)
*A47J 31/44* (2006.01)
*A47J 31/10* (2006.01)

(52) U.S. Cl.
CPC ......... *A47J 31/446* (2013.01); *A47J 31/0626* (2013.01); *A47J 31/0636* (2013.01); *A47J 31/10* (2013.01); *A47J 31/0689* (2013.01)

(58) Field of Classification Search
CPC .... A47J 31/0636; A47J 31/0626; A47J 31/08; A47J 31/0689
USPC .................. 99/323, 321, 317, 322, 304, 306
See application file for complete search history.

(56) References Cited

U.S. PATENT DOCUMENTS

| | | | | |
|---|---|---|---|---|
| 4,715,271 A | * | 12/1987 | Kitagawa ........... | B65D 85/8043 210/474 |
| 4,863,601 A | * | 9/1989 | Wittekind ............... | A47J 31/02 210/474 |
| 5,059,325 A | * | 10/1991 | Iida .................... | B65D 85/8043 210/474 |
| 5,132,124 A | * | 7/1992 | Tamaki .................. | A47G 19/16 210/474 |
| 7,128,934 B1 | * | 10/2006 | Ohta .................. | B65D 85/8043 426/82 |
| 10,932,606 B2 | * | 3/2021 | Cohen ................ | B65D 85/8043 |
| 2018/0257853 A1 | * | 9/2018 | Chuang .............. | B65D 85/8043 |

OTHER PUBLICATIONS https://okogreen.com.tw/blog/4535, Dec. 10, 2018, 11 pages (English translated).
http://meiko1101.pixnet.net/blog/post/30665377, Dec. 10, 2018, 10 pages (English translated).

\* cited by examiner

*Primary Examiner* — Reginald Alexander
(74) *Attorney, Agent, or Firm* — Alan D. Kamrath; Karin L. Williams; Mayer & Williams PC

(57) ABSTRACT

A drip coffee bag holder has a body. The body includes a first side wall, a second side wall, a first end wall, and a second end wall. The first and second side walls are joined by the first and second end walls. The first and second side walls and the first and second end walls enclose a space with the first and second side walls being opposite to each other and with the first and second end walls being opposite to each other. The first and second side walls each have a bottom including a mounting portion configured to mount on a brim of a cup. The space is configured to receive a drip coffee bag.

13 Claims, 16 Drawing Sheets

DRIP COFFEE BAG HOLDER

BACKGROUND OF THE INVENTION

1. Field of the Invention

The present invention relates to a holder and, particularly, to a drip coffee bag holder.

2. Description of the Related Art

FIG. 16 illustrates the use of a conventional drip bag coffee filter. The drip bag coffee filter has a bag for receiving coffee powders that have been ground and two hangers attached on opposite sides of the bag configured to hang on the brim of a cup.

As the FIG. 16 shows, at least half of the bag of the drip bag coffee filter is located in the cup. It is found that the bag ends up being immersed in coffee easily, affecting not only the efficiency of brewing, but also the taste of coffee.

The present invention is, therefore, intended to obviate or at least alleviate the problems encountered in the prior art.

SUMMARY OF THE INVENTION

According to the present invention, a drip coffee bag holder has a body. The body includes a first side wall, a second side wall, a first end wall, and a second end wall. The first and second side walls are joined by the first and second end walls. The first and second side walls and the first and second end walls enclose a space with the first and second side walls being opposite to each other and with the first and second end walls being opposite to each other. The first and second side walls each have a bottom including a mounting portion configured to mount on a brim of a cup. The space is configured to receive a drip coffee bag.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the public generally, and especially the scientists, engineers and practitioners in the art who are not familiar with patent or legal terms or phraseology, to determine quickly from a cursory inspection the nature and essence of the technical disclosure. The abstract is neither intended to define the invention, which is measured by the claims, nor is it intended to be limiting as to the scope of the invention in any way.

Other objectives, advantages, and new features of the present invention will become apparent from the following detailed description of the invention when considered in conjunction with the accompanied drawings.

DETAILED DESCRIPTION OF THE INVENTION

Figure 1:
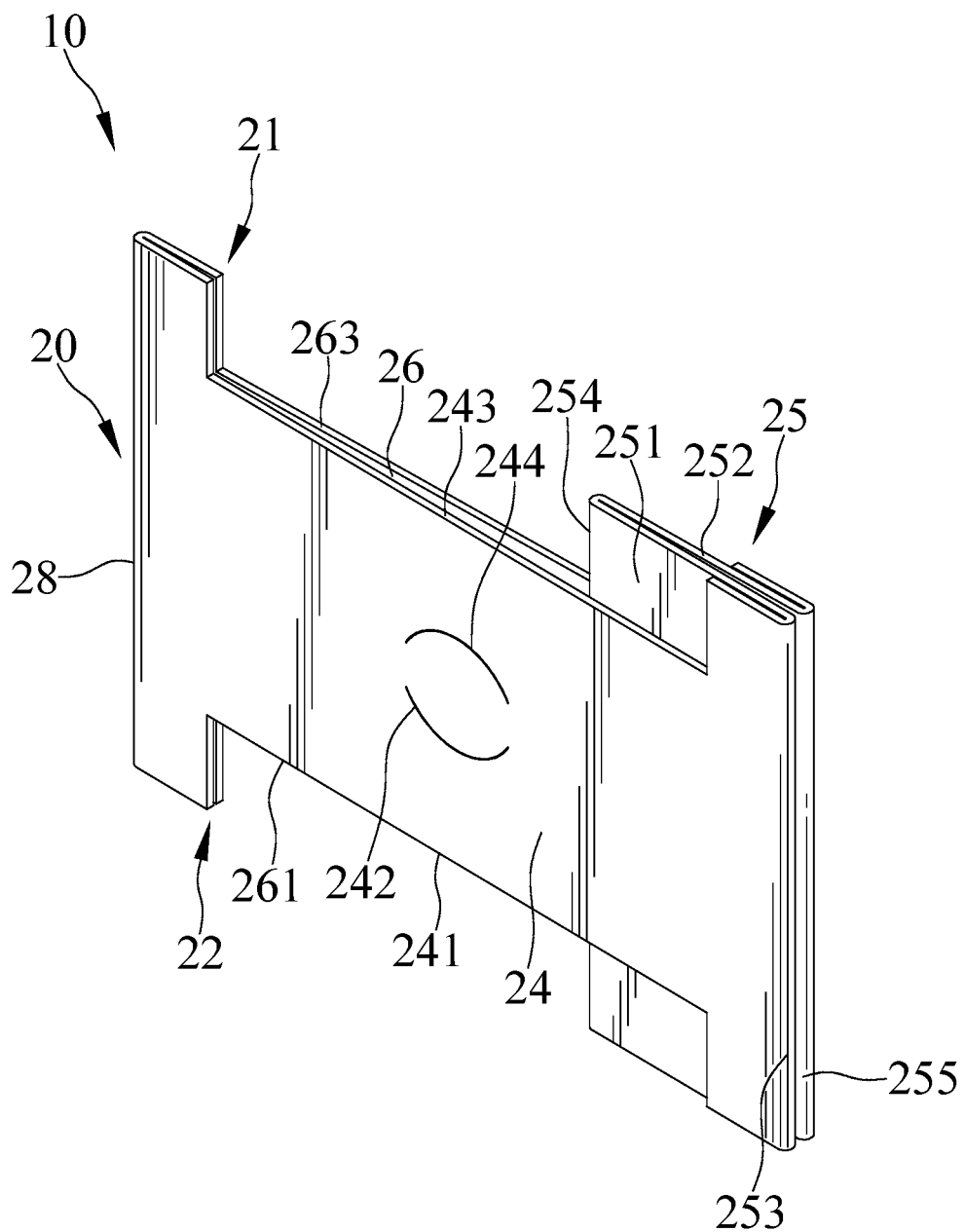
FIG. 1 is a perspective view of a drip coffee bag holder in accordance with a first embodiment of the present invention in a collapsed position.
Figure 2:
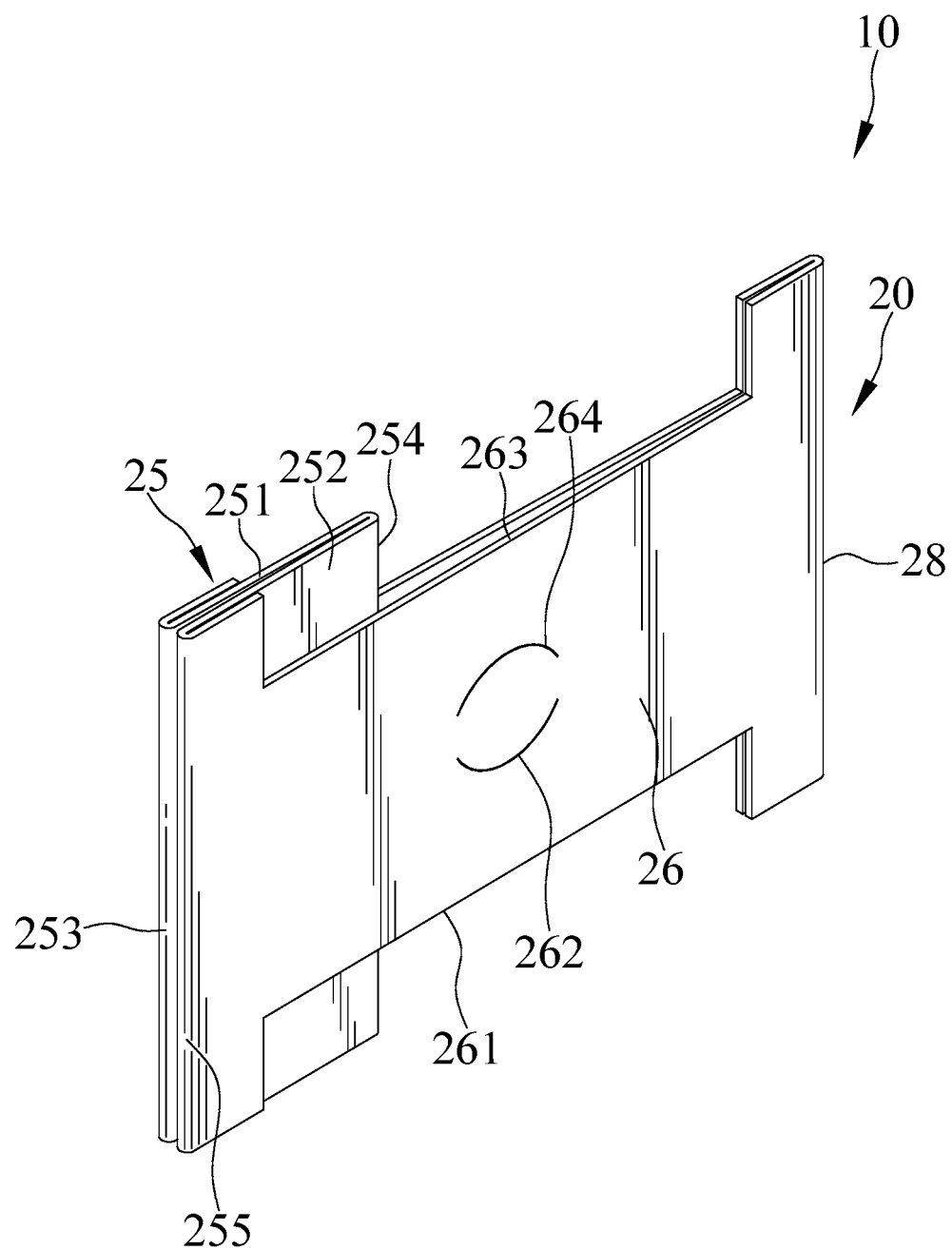
FIG. 2 is a perspective view of the drip coffee bag holder similar to FIG. 1, but taken from a different angle.
Figure 3:
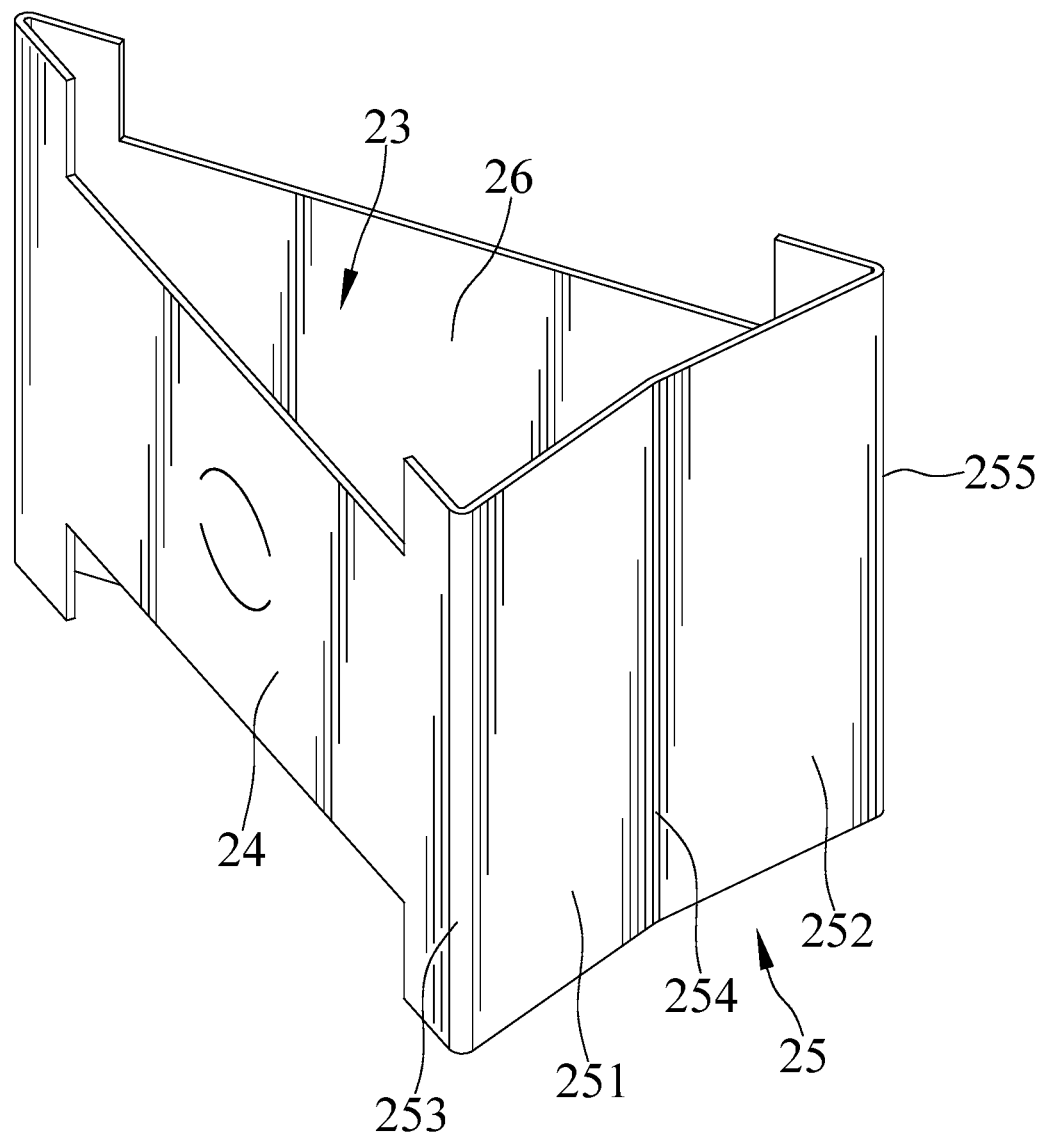
FIG. 3 is a perspective view of the drip coffee bag holder of FIG. 1 in an expanded position.
Figure 4:
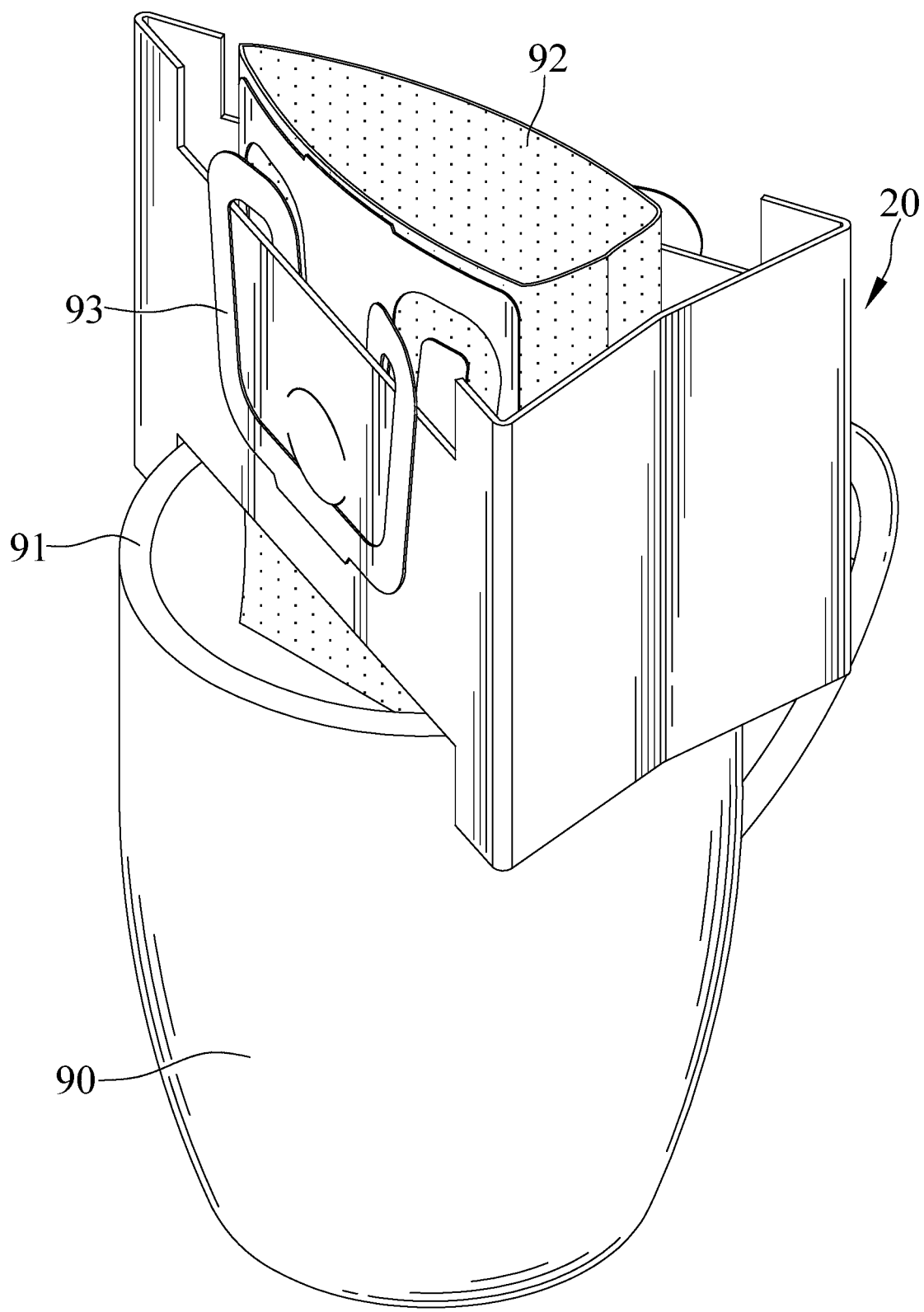
FIG. 4 is a perspective view illustrating the use of the drip coffee bag holder of FIG. 1.
Figure 5:
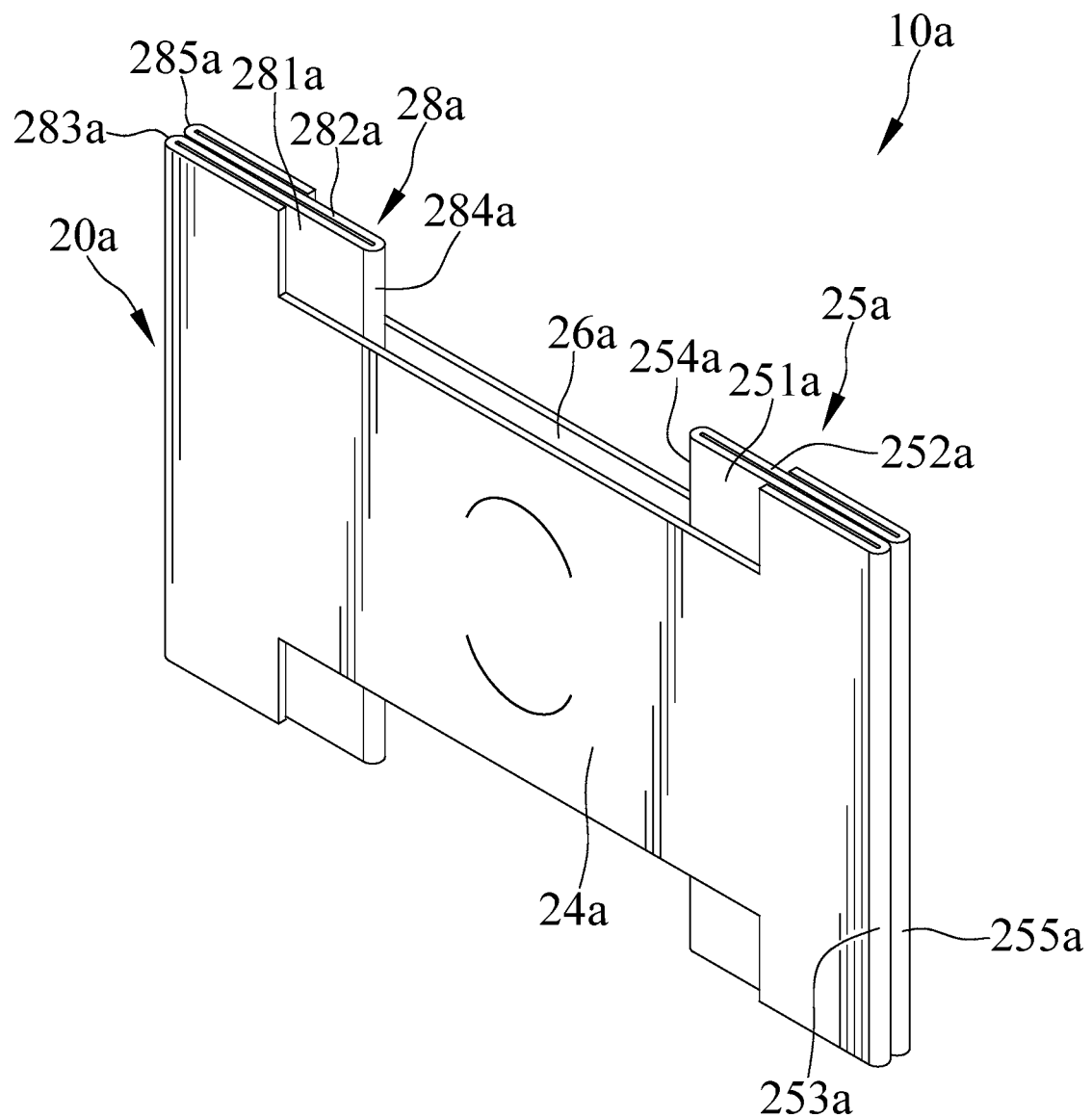
FIG. 5 is a perspective view of a drip coffee bag holder in accordance with a second embodiment of the present invention in a collapsed position.
Figure 6:
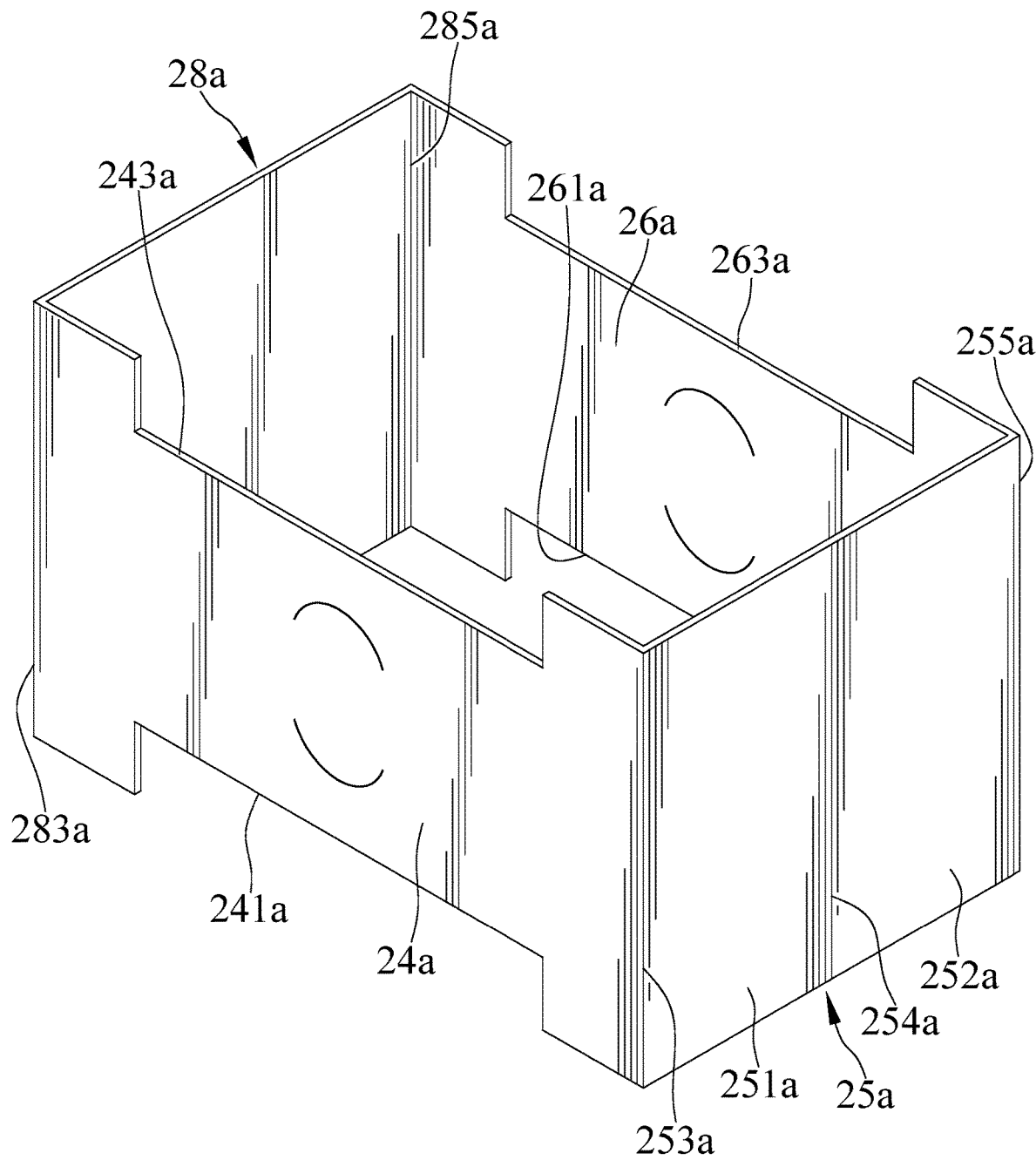
FIG. 6 is a perspective view of the drip coffee bag holder of FIG. 5 in an expanded position.
Figure 7:
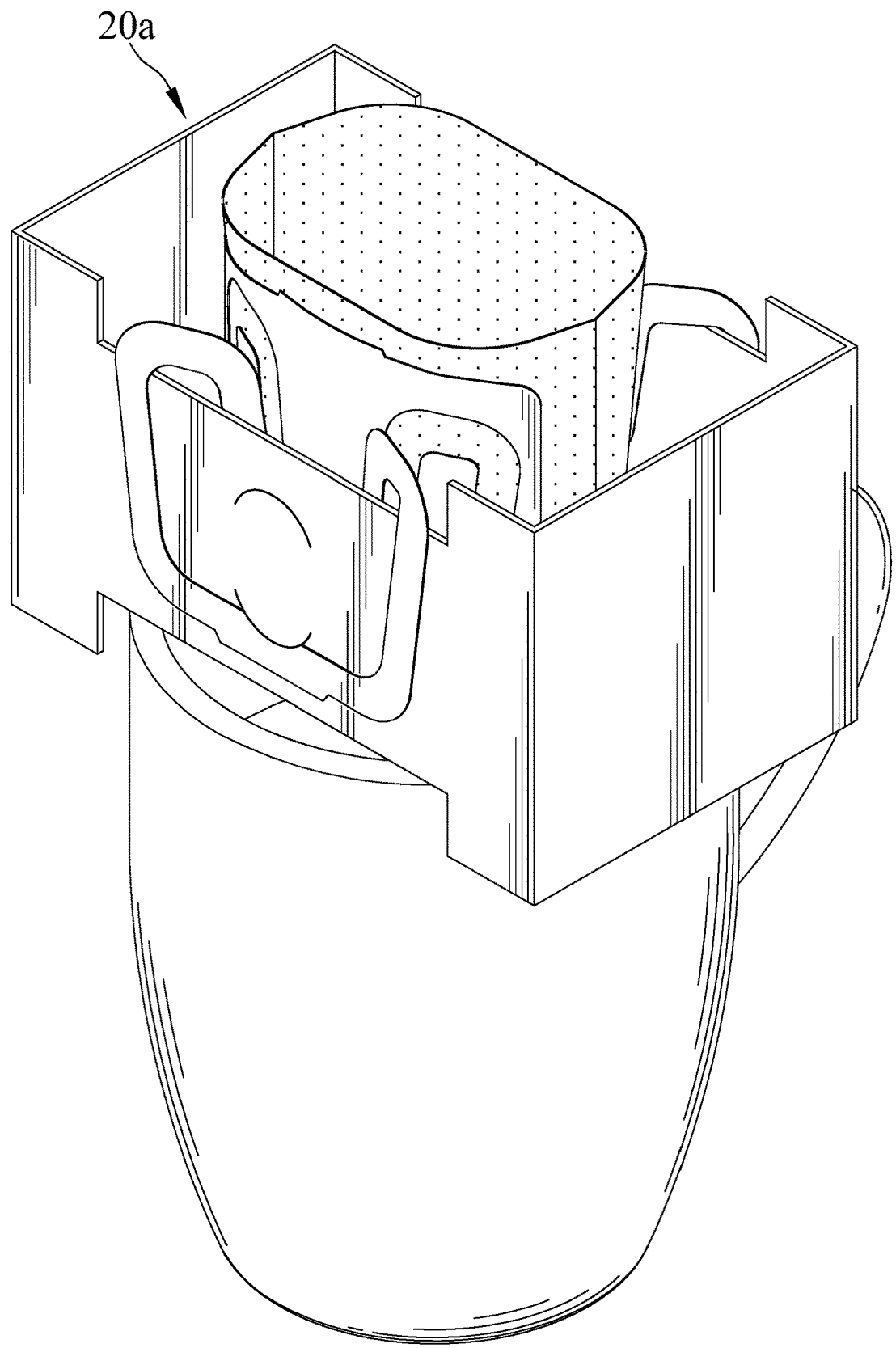
FIG. 7 is a perspective view illustrating the use of the drip coffee bag holder of FIG. 5.
Figure 8:
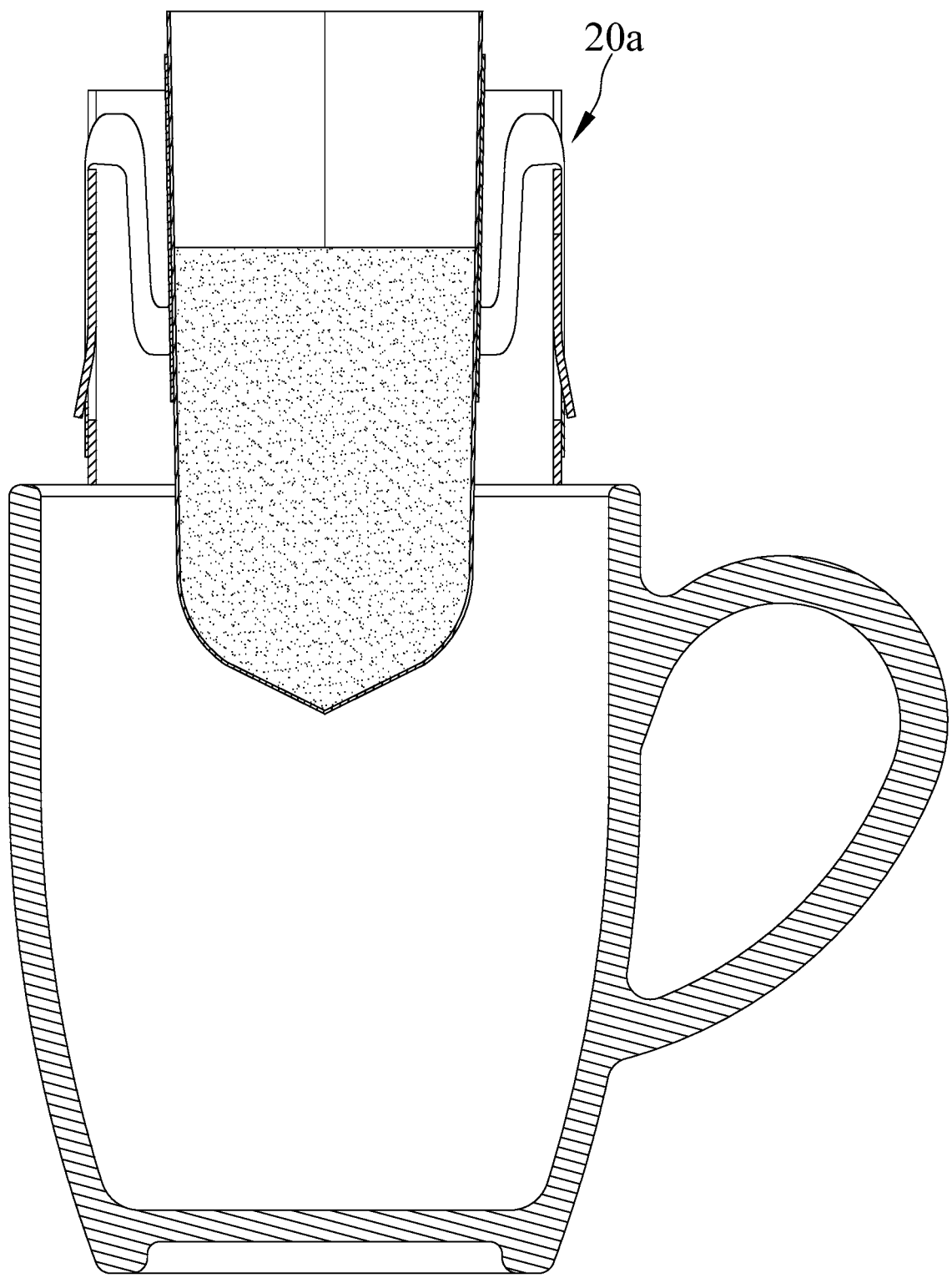
FIG. 8 is a cross-sectional view of FIG. 7.
Figure 9:
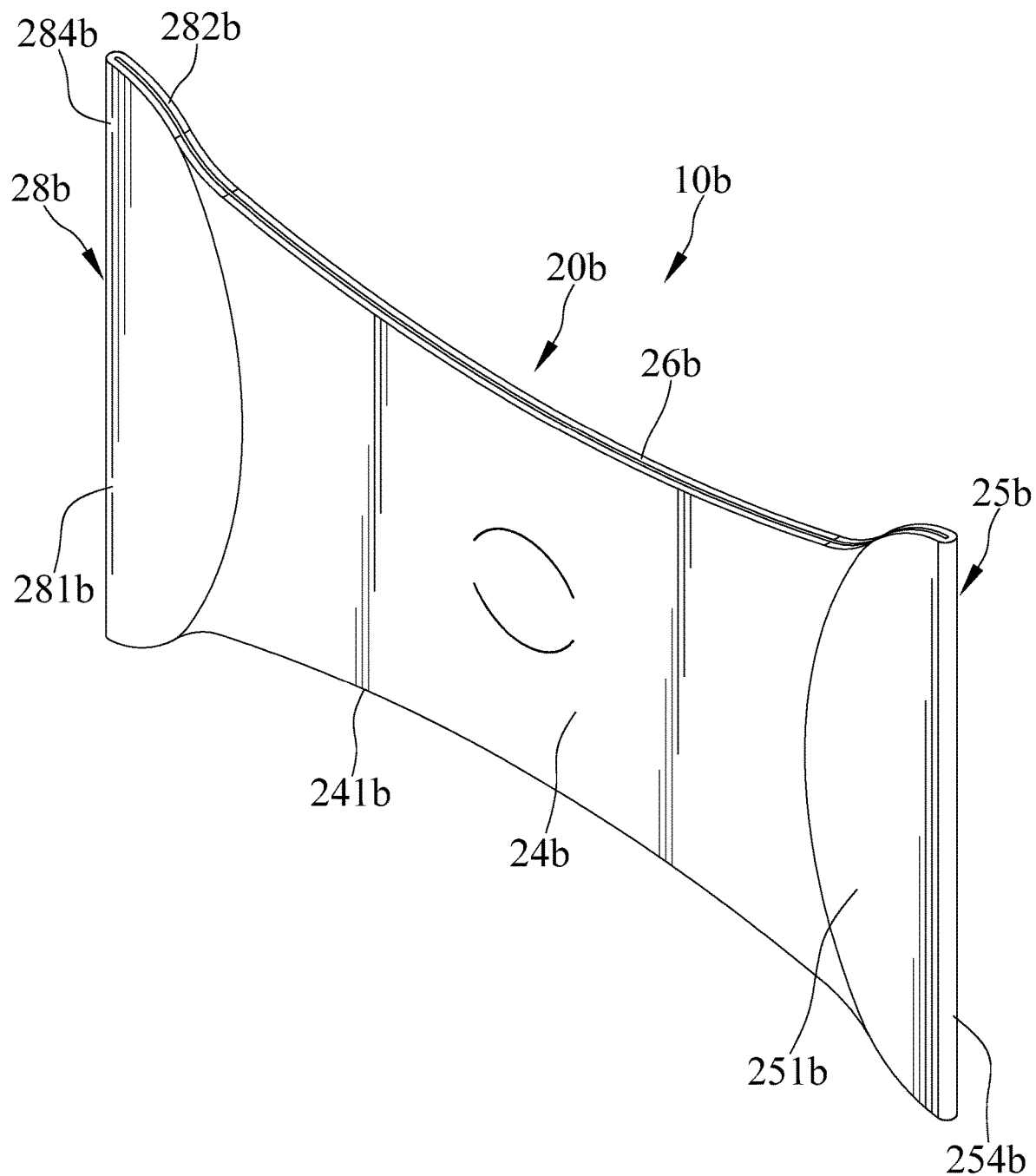
FIG. 9 is a perspective view of a drip coffee bag holder in accordance with a third embodiment of the present invention in a collapsed position.
Figure 10:
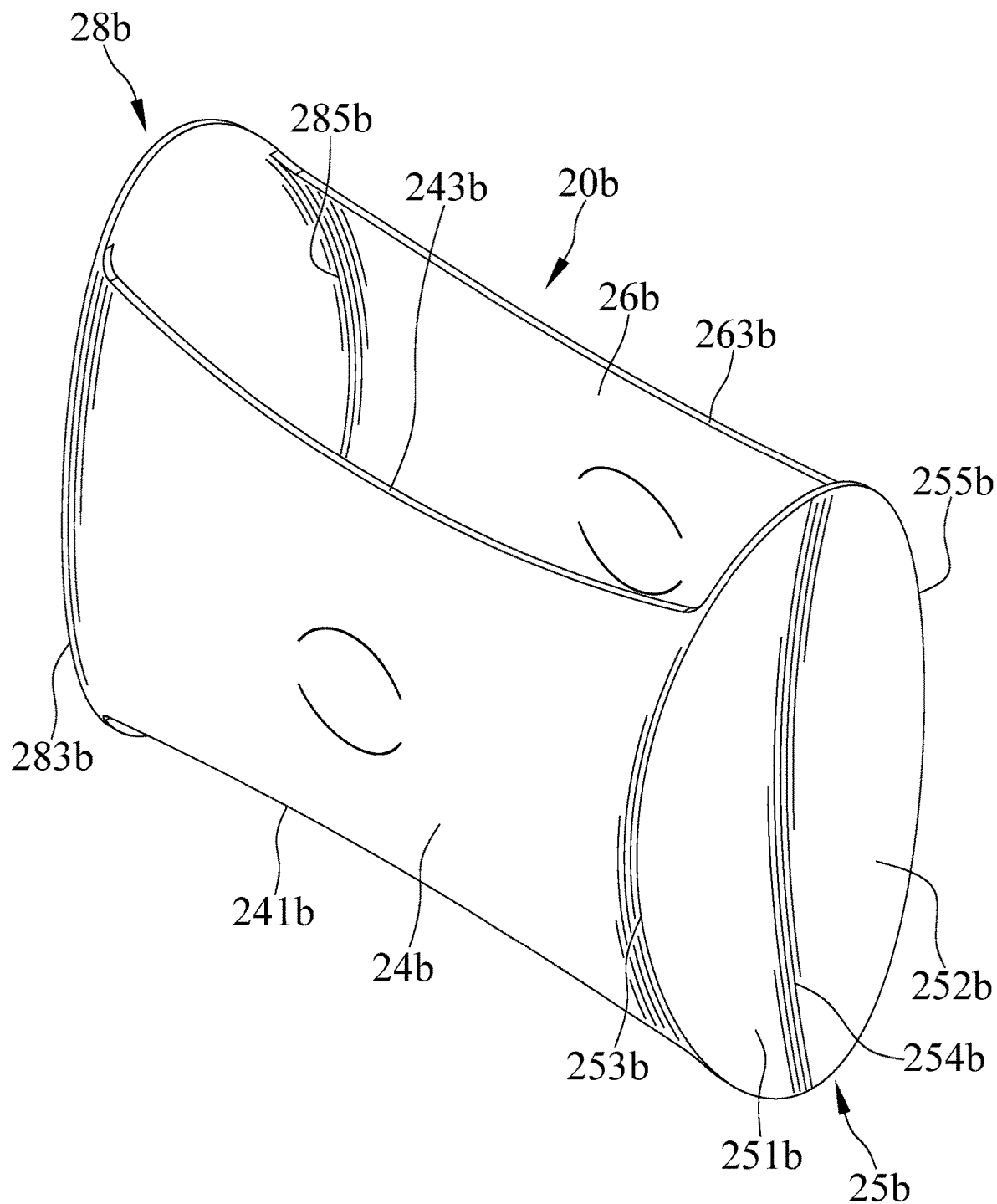
FIG. 10 is a perspective view of the drip coffee bag holder of FIG. 9 in an expanded position.
Figure 11:
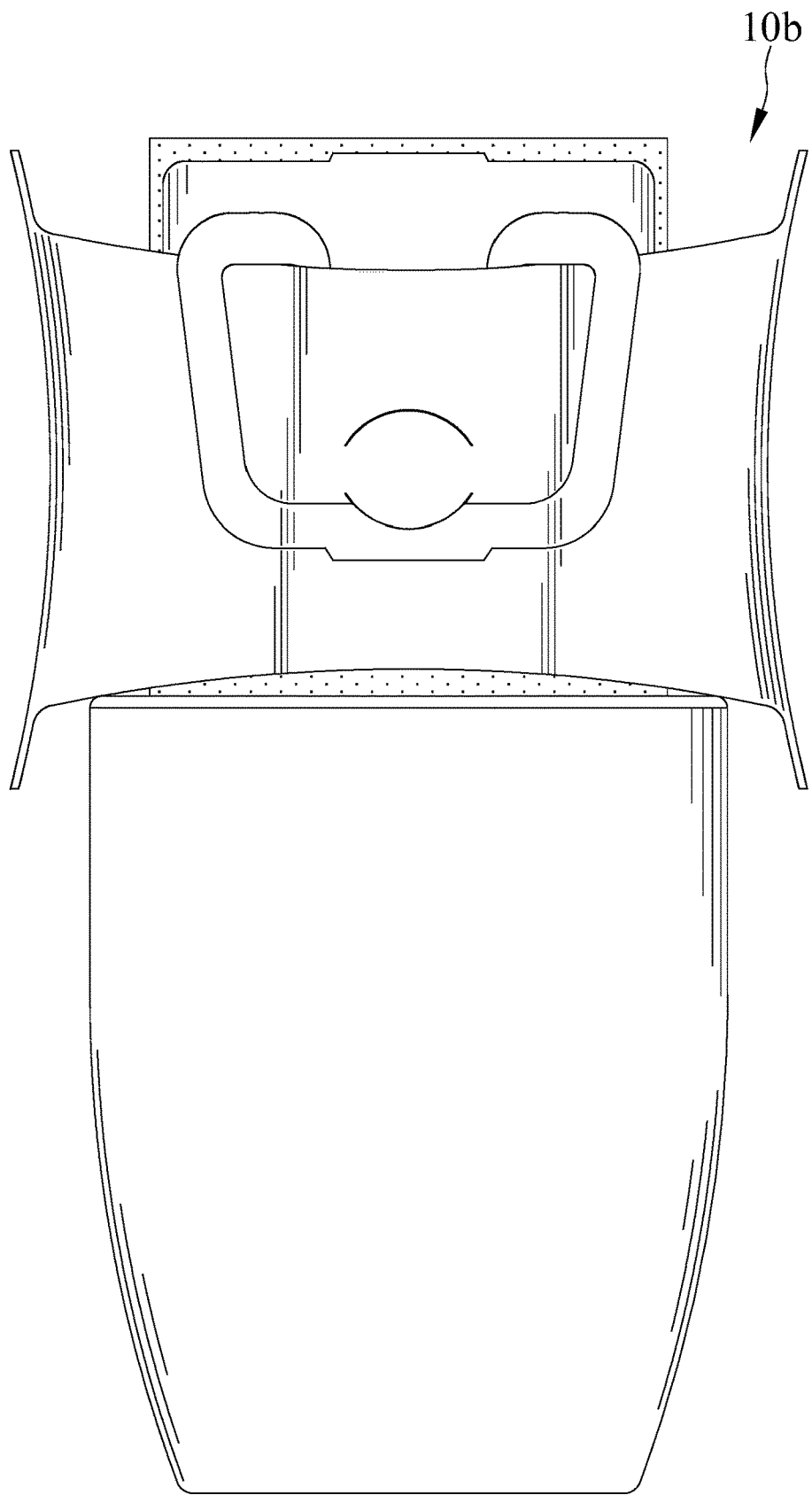
FIG. 11 is a side view illustrating the use of the drip coffee bag holder of FIG. 9.
Figure 12:
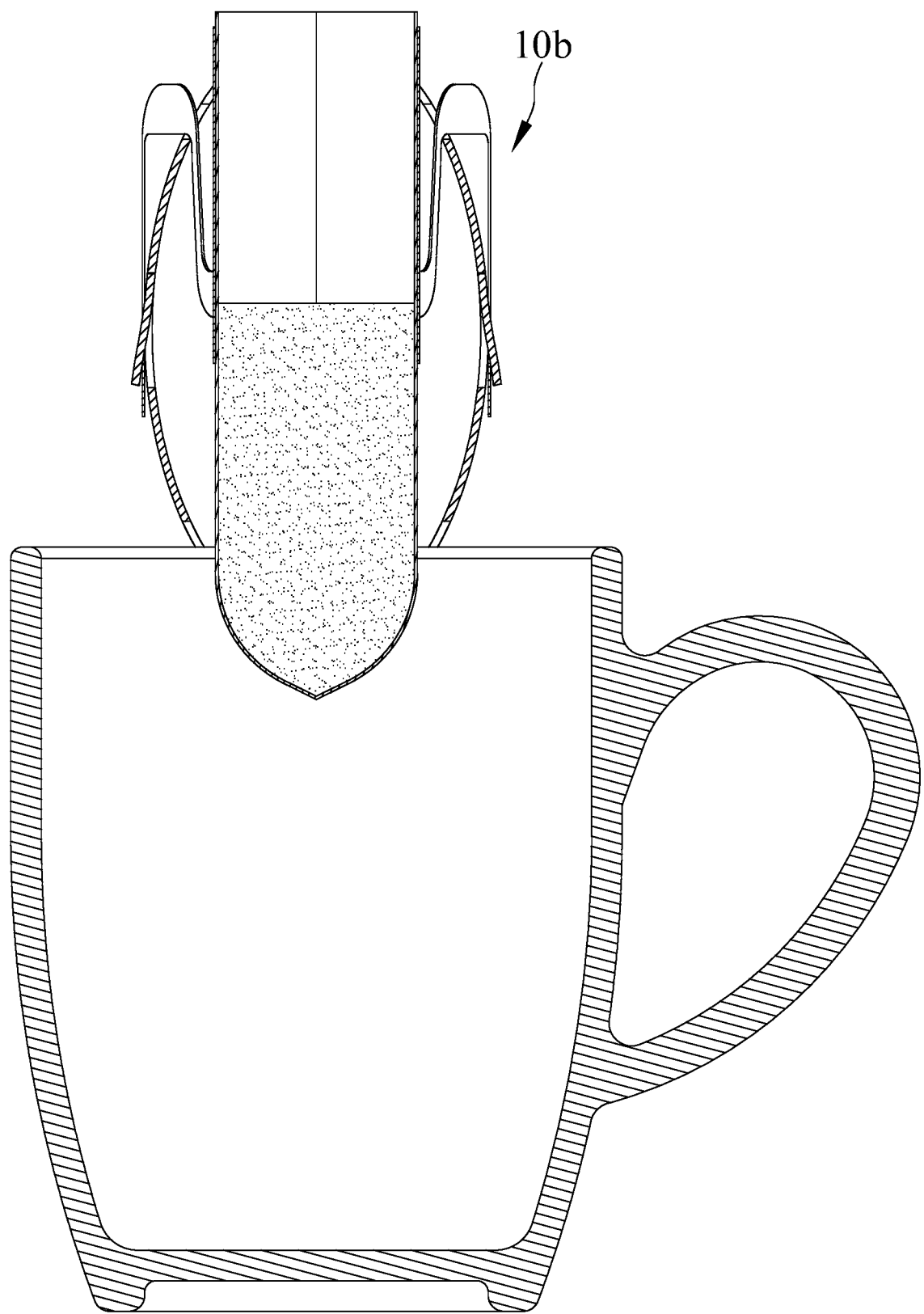
FIG. 12 is a cross-sectional view of FIG. 11.

FIGS. 1 through 4 show a drip coffee bag holder 10 in accordance with a first embodiment of the present invention. The drip coffee bag holder 10 has an integral one-piece body 20. The body 20 is made of paper. The body 20 includes a first side wall 24, a second side wall 26, a first end wall 25, and a second end wall 28. The first and second side walls 24 and 26 are joined by the first and second end walls 25 and 28.

The first and second side walls 24 and 26 and the first and second end walls 25 and 28 enclose a space 23 with the first and second side walls 24 and 26 being opposite to each other and with the first and second end walls 25 and 28 being opposite to each other. The space 23 is configured to receive a drip coffee bag 92.

The first and second side walls 24 and 26 each have a bottom 22 including a mounting portion configured to mount on a brim 91 of a cup 90.

Each of the first and second side walls 24 and 26 is cut to form at least one cut 242 and 262 and a clipping portion adapted to clip hanging ears 93 of the drip coffee bag 92. The first side wall 24 includes cuts 242 and 244 disposed in a spaced relationship with the cut 242 disposed adjacent at a lower height and the cut 244 at a higher height. The second side wall 26 includes cuts 262 and 264 disposed in a spaced relationship with the cut 262 disposed adjacent at a lower height and the cut 264 at a higher height. The cuts 242 and 262 are at the same height. The cuts 244 and 264 are at the same height. Each of the cuts 242, 244, 262, and 264 is cut curvedly.

The first end wall 25 includes a first wall portion 251 and a second wall portion 252. The first wall portion 251 and the first side wall 24 include a first bend 253 therebetween. The second wall portion 252 and the second side wall 26 include a second bend 255 therebetween. The first and second side walls 24 and 26 include the second end wall 28 therebetween forming a fourth bend. The body 20 is expandable and collapsible. The first wall portion 251 is adapted to be folded along the first bend 253 toward the first side wall 24. The second wall portion 252 is adapted to be folded along the second bend 255 toward the second side wall 26. The first and second wall portions 251 and 252 are adapted to be folded toward each other along a third bend 254 which is between the first and second wall portions 251 and 252. The first and second side walls 24 and 26 are adapted to be folded toward each other along the fourth bend.

When in use of the drip coffee bag holder 10, the body 20 is expanded. When the body 20 is expanded, the first wall portion 251 is not folded toward the first side wall 24, the second wall portion 252 is not folded toward the second side wall 26, and the first and second wall portions 251 and 252 are not folded toward each other. Further, the first and second wall portions 251 and 252 extend transversely to the first and second side walls 24 and 26. Further, the first and second side walls 24 and 26 extend divergently from the second end wall 28 toward the first end wall 25. Further, the space 23 has an opening that allows the insertion of the drip coffee bag 92.

When the body 20 is collapsed, the first wall portion 251 is folded toward the first side wall 24, the second wall portion 252 is folded toward the second side wall 26, and the first and second wall portions 251 and 252 are folded toward each other. Further, the first and second wall portions 251 and 252 are sandwiched between the first and second side walls 24 and 26.

The mounting portions on the bottoms 22 of the first and second side walls 24 and 26 extend inwardly and respectively define first and second recesses 241 and 261. When in use of the drip coffee bag holder 10, the body 20 is stably supported by the brim 91 of the cup 90 because bottoms 22 of the first and second recesses 241 and 261 can mount stably on the brim 91 of the cup 90. The first and second side walls 24 and 26 each have a top 21 being opposite to the bottom 22 and extending inwardly and respectively defining third and fourth recesses 243 and 263 configured to bear the hanging ears 93 of the drip coffee bag 92. When the drip coffee bag holder 10 holds the drip coffee bag 92, the third and fourth recesses 243 and 263 can stably bear the hanging ears 93. The first and second recesses 241 and 261 have corresponding shapes and include respective bottom sides for engaging with the brim 91 of the cup 90 extending linearly and horizontally. The third and fourth recesses 243 and 263 have corresponding shapes and include respective bottom sides for engaging with the hanging ears 93 of the drip coffee bag 92 extending linearly and horizontally.

FIGS. 5 through 8 show a drip coffee bag holder 10a in accordance with a second embodiment of the present invention, and the same numbers are used to correlate similar components of the first embodiment, but bearing a letter a. The second embodiment includes a body 20a. The body 20a includes a first side wall 24a, a second side wall 26a, a first end wall 25a, and a second end wall 28a. The body 20a is expandable and collapsible. The first and second side walls 24a and 26a each have a bottom including a mounting portion. The mounting portions on the bottoms of the first and second side walls 24a and 26a extend inwardly and respectively define first and second recesses 241a and 261a. The first and second side walls 24a and 26a each have a top being opposite to the bottom and extending inwardly and respectively defining third and fourth recesses 243a and 263a.

The second embodiment is similar to the first embodiment except the second end wall 28a. The second end wall 28a includes a third wall portion 281a and a fourth wall portion 282a. The third wall portion 281a and the first side wall 24a include a fourth bend 283a therebetween. The second wall portion 282a and a second side wall 26a include a fifth bend 285a therebetween. The third wall portion 281a is adapted to be folded along the fourth bend 283a toward the first side wall 24a. The fourth wall portion 282a is adapted to be folded along the fifth bend 285a toward the second side wall 26a. The third and fourth wall portions 281a and 282a are adapted to be folded toward each other along a sixth bend 284a which is between the third and fourth wall portions 281a and 282a. When the body 20a is expanded, the third and fourth wall portions 281a and 282a extend transversely to the first and second side walls 24a and 26a. When the body 20a is collapsed, the third and fourth wall portions 281a and 282a are sandwiched between the first and second side walls 24a and 26a.

FIGS. 9 through 12 show a drip coffee bag holder 10b in accordance with a third embodiment of the present invention, and the same numbers are used to correlate similar components of the first embodiment, but bearing a letter b. The third embodiment includes a body 20b. The body 20b includes a first side wall 24b, a second side wall 26b, a first end wall 25b, and a second end wall 28b. The body 20b is expandable and collapsible. The first and second side walls 24b and 26b each have a bottom including a mounting portion. The mounting portions on the bottoms of the first and second side walls 24b and 26b extend inwardly and respectively define a first recess 241b and a second recess. The first and second side walls 24a and 26a each have a top being opposite to the bottom and extending inwardly and respectively defining third recess 243b and fourth recesses. A first wall portion 251b is adapted to be bent along a first bend 253b with respect to a first side wall 24b. A second wall portion 252b is adapted to be bent along a second bend 255b with respect to a second side wall 26b. The first and second wall portions 251b and 252b are adapted to be folded toward each other along a third bend 254b which is between the first and second wall portions 251b and 252b. When the body 20b is expanded, the first and second wall portions 251b and 252b extend transversely to the first and second side walls 24b and 26b.

The third embodiment is similar to the first embodiment except that the first, second, third and fourth recesses 241b, 243b, 263b extend concavely. Further, the first and second wall portions 251b and 252b are respectively aligned with the first and second side walls 24b and 26b when the body 20b is collapsed. Further, a second end wall 28b includes a third wall portion 281b and a fourth wall portion 282b. The third wall portion 281b and the first side wall 24b include a fourth bend 283b therebetween. The second wall portion 282b and the second side wall 26b include a fifth bend 285b therebetween. The third wall portion 281b is adapted to be bent along the fourth bend 283b with respect to the first side wall 24b. The fourth wall portion 282b is adapted to be bent along the fifth bend 285b with respect to the second side wall 26b. The third and fourth wall portions 281b and 282b are adapted to be folded toward each other along a sixth bend 284b which is between the third and fourth wall portions 281b and 282b. When the body 20b is expanded, the third and fourth wall portions 281b and 282b extend transversely to the first and second side walls 24b and 26b. When the body 20b is collapsed, the third and fourth wall portions 281b and 282a are respectively aligned with the first and second side walls 24b and 26b.

Figure 13:
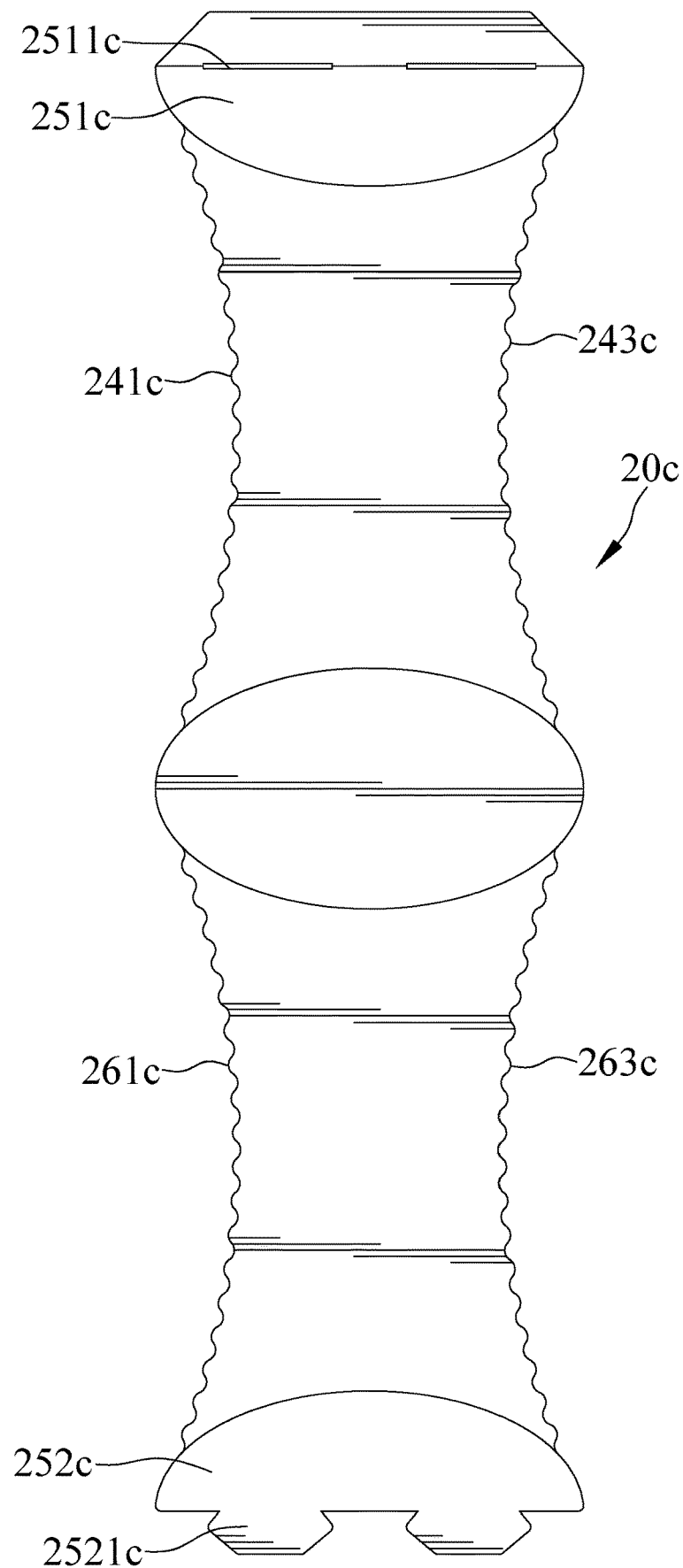
FIG. 13 a side view of showing drip coffee bag holder in accordance with a fourth embodiment of the present invention unassembled.
Figure 14:
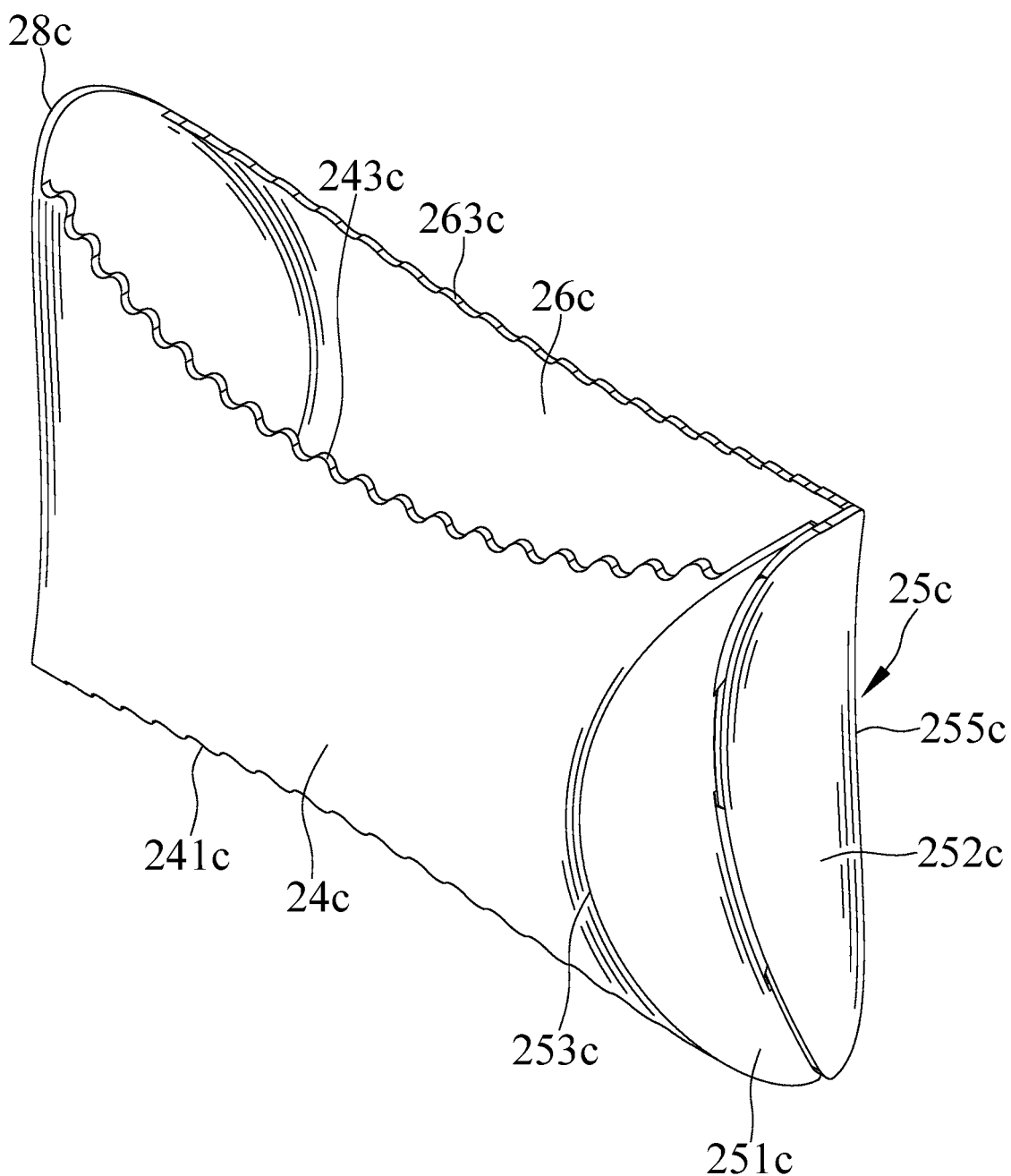
FIG. 14 is a perspective view showing the drip coffee bag holder of FIG. 13 assembled and in an expanded position.
Figure 15:
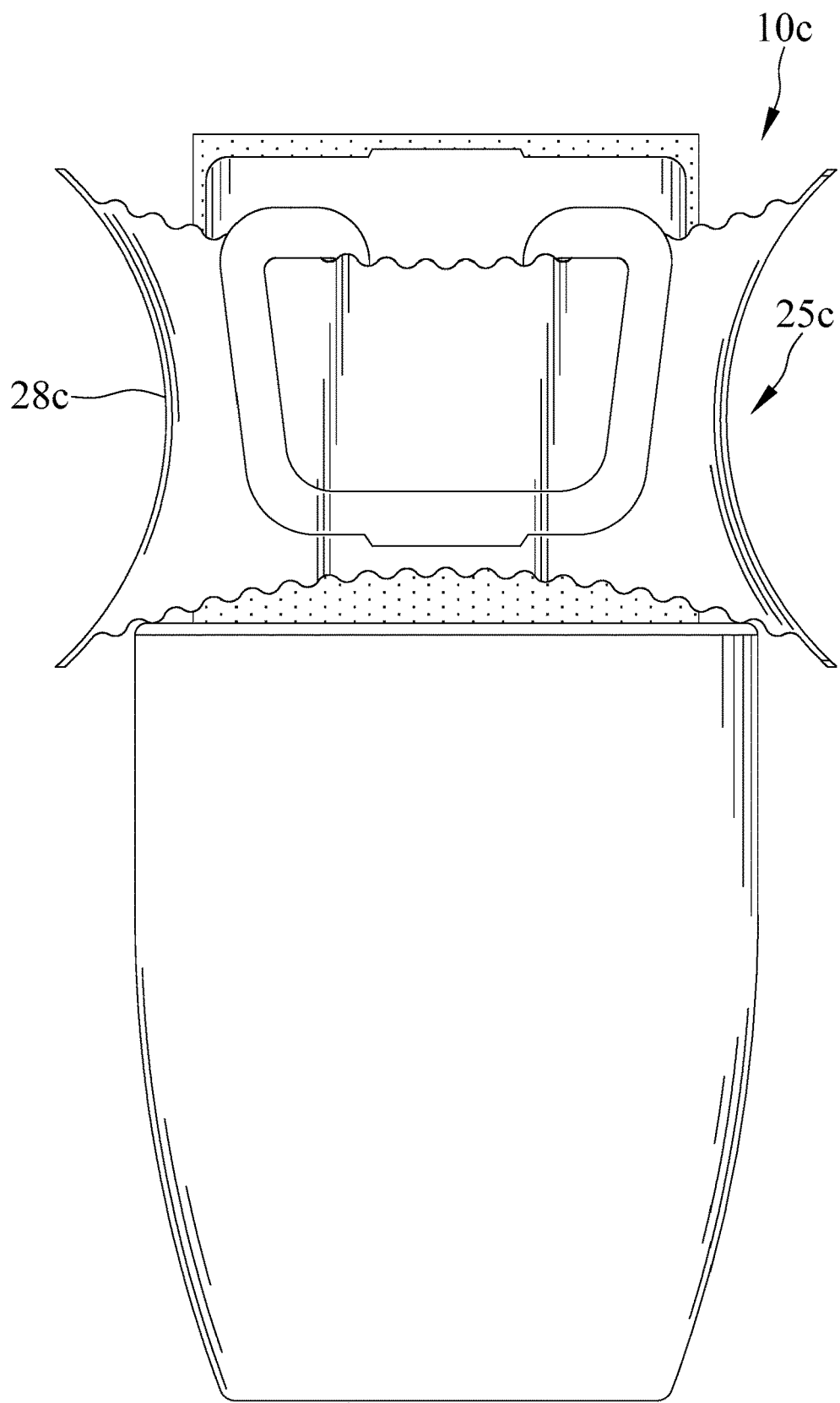
FIG. 15 is a cross-sectional view illustrating the use of the drip coffee bag holder of FIG. 13.
Figure 16:
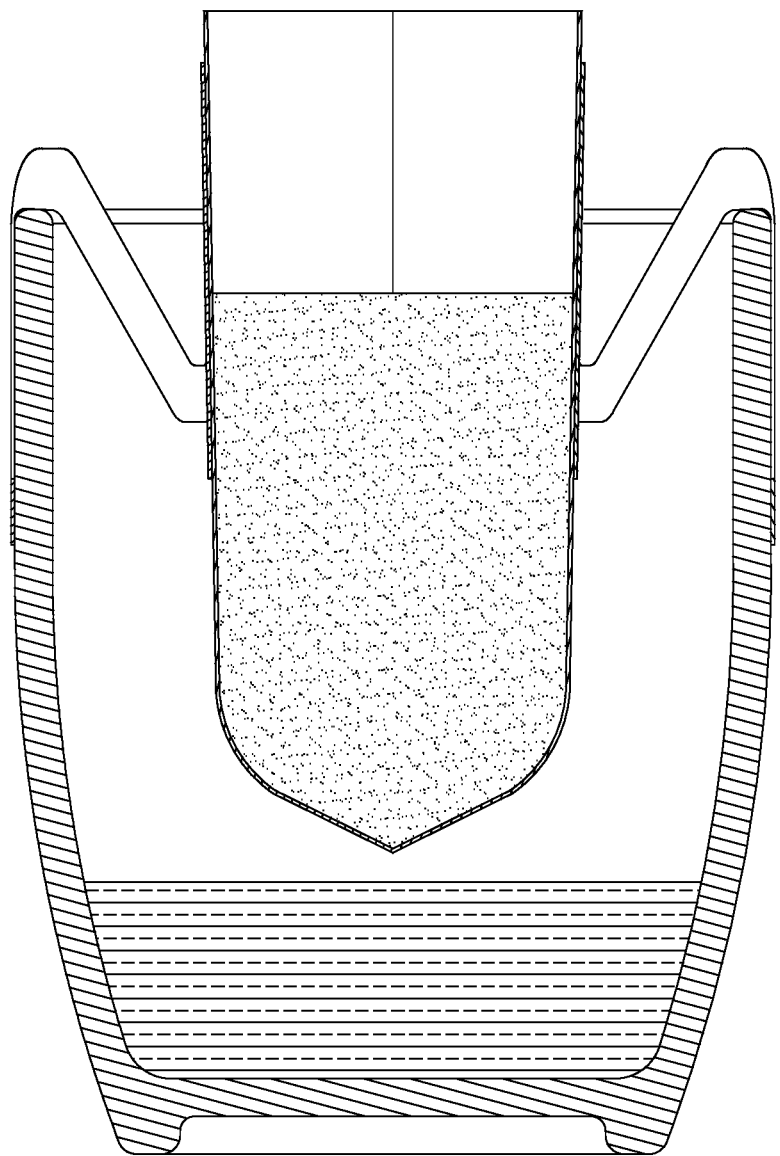
FIG. 16 is a cross-sectional view illustrating the use of a conventional drip coffee bag holder.

FIGS. 13 through 15 show a drip coffee bag holder in accordance with a fourth embodiment of the present invention, and the same numbers are used to correlate similar components of the first embodiment, but bearing a letter c. The fourth embodiment includes a body 20c. The body 20a includes a first side wall 24c, a second side wall 26c, a first end wall 25c, and a second end wall 28c. The first and second side walls 24c and 26c each have a bottom including a mounting portion. The mounting portions on the bottoms of the first and second side walls 24c and 26c extend inwardly and respectively define first and second recesses 241b\c and 261c. The first and second side walls 24c and 26c each have a top being opposite to the bottom and extending inwardly and respectively defining third and recess 243c and 263c.

The fourth embodiment is similar to the first embodiment except that the first, second, third, and fourth recesses 241c, 261c, 243c, and 263c include respective bottom sides extending concavely. The bottom sides of the first and second recesses 241c and 261c are uneven and with a plurality of notches. The bottom sides of the third and fourth recesses 243c and 263c are uneven and with a plurality of notches. The plurality of notches of the first and second recesses 241c and 261c prevent the drip coffee bag holder 10b from moving on the brim 91 of the cup 90. Likewise, the plurality of notches of the third and fourth recesses 243b and 263c prevent the hanging ears 93 of the drip coffee bag 92 from moving on the drip coffee bag holder 10c. Further, a first end wall 25c includes a first wall portion 251c and a second wall portion 252c joined to each other by a joining or attaching means. In this embodiment, the first wall portion 251c includes at least one slot 2511c and the second wall portion 252c includes at least one tab 2521c adapted to be inserted into the at least one slot 2511c. When the first and second wall portions 251c and 252c are jointed to each other, the at least one tab 2521c is inserted into the at least one slot 2511c.

In view of the foregoing, the drip coffee bag holder 10, 10a, 10b, and 10c are disposed on the brim 91 of the cup 90 and can hold the drip coffee bag 92 at a height sufficient enough to prevent the drip coffee bag 92 from being immersed in coffee easily. Further, each of the drip coffee bag holder 10, 10a, 10b, and 10c can be supported by the brim 91 of the cup 90 stably. Further, the drip coffee bag holder 10, 10a, 10b, and 10e can hold the drip coffee bag 92 in place.

The foregoing is merely illustrative of the principles of this invention and various modifications can be made by those skilled in the art without departing from the scope and spirit of the invention.

What is claimed is:

1. A drip coffee bag holder comprising:
an integral one-piece body, wherein the body includes a first side wall, a second side wall, a first end wall, and a second end wall, wherein the first and second side walls are joined by the first and second end walls, wherein the first and second side walls and the first and second end walls enclose a space with the first and second side walls being opposite to each other and with the first and second end walls being opposite to each other, wherein the first and second side walls each have a bottom including a mounting portion configured to mount on a brim of a cup, and wherein the space is configured to receive a drip coffee bag; and
wherein the first and second side walls each have a top being opposite to the bottom and extending inwardly and respectively defining third and fourth recesses configured to bear hanging ears of the drip coffee bag.

2. The drip coffee bag holder as claimed in claim 1, wherein the first end wall includes a first wall portion and a second wall portion, wherein the first wall portion and the first side wall include a first bend therebetween, and wherein the second wall portion and the second side wall include a second bend therebetween.

3. The drip coffee bag holder as claimed in claim 2, wherein the body is expandable and collapsible, wherein the first wall portion is adapted to be folded along the first bend toward the first side wall, wherein the second wall portion is adapted to be folded along the second bend toward the second side wall, wherein the first and second wall portions are adapted to be folded toward each other along a third bend which is between the first and second wall portions, wherein when the body is expanded, the first and second wall portions extend transversely to the first and second side walls, and wherein when the body is collapsed, the first and second wall portions are sandwiched between the first and second side walls.

4. The drip coffee bag holder as claimed in claim 3, wherein the first and second side walls include the second end wall therebetween forming a fourth bend, and wherein the first and second side walls are adapted to be folded toward each other along the fourth bend, and wherein the first and second side walls extend divergently from the second end wall toward the first end wall.

5. The drip coffee bag holder as claimed in claim 3, wherein the second end wall includes a third wall portion and a fourth wall portion, wherein the third wall portion and the first side wall include a fourth bend therebetween, wherein the second wall portion and the second side wall include a fifth bend therebetween, wherein the third wall portion is adapted to be folded along the fourth bend toward the first side wall, wherein the fourth wall portion is adapted to be folded along the fifth bend toward the second side wall, wherein the third and fourth wall portions are adapted to be folded toward each other along a sixth bend which is between the third and fourth wall portions, wherein when the body is expanded, the third and fourth wall portions extend transversely to the first and second side walls, and wherein when the body is collapsed, the third and fourth wall portions are sandwiched between the first and second side walls.

6. The drip coffee bag holder as claimed in claim 1, wherein the mounting portions on the bottoms of the first and second side walls extend inwardly and respectively define first and second recesses.

7. The drip coffee bag holder as claimed in claim 1, wherein the first and second recesses have corresponding shapes and include respective bottom sides for engaging with the brim of the cup extending linearly and horizontally, and wherein the third and fourth recesses have corresponding shapes and include respective bottom sides for engaging with the hanging ears of the drip coffee bag extending linearly and horizontally.

8. The drip coffee bag holder as claimed in claim 1, wherein the first and second recesses have corresponding shapes and include respective bottom sides for engaging with the brim of the cup extending concavely, and wherein the third and fourth recesses have corresponding shapes and include respective bottom sides for engaging with the hanging ears extending concavely.

9. The drip coffee bag holder as claimed in claim 8, wherein the bottom sides of the first and second recesses are uneven and with a plurality of notches, and wherein the bottom sides of the third and fourth recesses are uneven and with a plurality of notches.

10. The drip coffee bag holder as claimed in claim 6, wherein the first and second side walls each have a top being opposite to the bottom and extending inwardly and respectively defining third and fourth recesses configured to bear hanging ears of the drip coffee bag.

11. The drip coffee bag holder as claimed in claim 3, wherein the mounting portions on the bottoms of the first and second side walls extend inwardly and respectively define first and second recesses, and wherein the first and second side walls each have a top being opposite to the bottom and extending inwardly and respectively defining third and fourth recesses configured to bear hanging ears of the drip coffee bag.

12. A drip coffee bag holder comprising:
an integral one-piece body, wherein the body includes a first side wall, a second side wall, a first end wall, and a second end wall, wherein the first and second side walls are joined by the first and second end walls, wherein the first and second side walls and the first and second end walls enclose a space with the first and second side walls being opposite to each other and with the first and second end walls being opposite to each other, wherein the first and second side walls each have a bottom including a mounting portion configured to mount on a brim of a cup, and wherein the space is configured to receive a drip coffee bag;

wherein the first end wall includes a first wall portion and a second wall portion, wherein the first wall portion and the first side wall include a first bend therebetween, and wherein the second wall portion and the second side wall include a second bend therebetween; and wherein the first wall portion and the second wall portion are joined to each other; and wherein the first wall portion includes at least one slot and the second wall portion includes at least one tab adapted to be inserted into the at least one slot, and wherein when the first and second wall portions are joined to each other the at least one tab is inserted into the at least one slot.

13. A drip coffee bag holder comprising:
an integral one-piece body, wherein the body includes a first side wall, a second side wall, a first end wall, and a second end wall, wherein the first and second side walls are joined by the first and second end walls, wherein the first and second side walls and the first and second end walls enclose a space with the first and second side walls being opposite to each other and with the first and second end walls being opposite to each other, wherein the first and second side walls each have a bottom including a mounting portion configured to mount on a brim of a cup, and wherein the space is configured to receive a drip coffee bag; and wherein each of the first and second side walls is cut to form at least one cut and a clipping portion adapted to clip the hanging ears of the drip coffee bag.

* * * * *